US008443368B2

(12) United States Patent
Guilley et al.

(10) Patent No.: US 8,443,368 B2
(45) Date of Patent: May 14, 2013

(54) USER CONTROLLED RECONFIGURING AND SAVING OF A TASK CONTEXT COMPRISING A CONFIGURATION OF A SET OF TOOLS USED BY THE USER

(75) Inventors: Fabien Guilley, Merenvielle (FR); Gabrielle De Brito, Lapeyrouse-Possat (FR); Gilles Francois, Toulouse (FR)

(73) Assignee: Thales, Neuilly sur Seine (FR)

( * ) Notice: Subject to any disclaimer, the term of this patent is extended or adjusted under 35 U.S.C. 154(b) by 711 days.

(21) Appl. No.: 12/636,851

(22) Filed: Dec. 14, 2009

(65) Prior Publication Data
US 2010/0162255 A1 Jun. 24, 2010

(30) Foreign Application Priority Data

Dec. 23, 2008 (FR) .................................... 08 07405

(51) Int. Cl.
*G06F 9/46* (2006.01)
*G06F 3/00* (2006.01)
*G06F 7/00* (2006.01)

(52) U.S. Cl.
USPC ............ 718/103; 715/700; 715/712; 707/609

(58) Field of Classification Search ........................ None
See application file for complete search history.

(56) References Cited

U.S. PATENT DOCUMENTS

| 4,658,351 | A | * | 4/1987 | Teng | ............................. | 718/103 |
| 5,542,088 | A | * | 7/1996 | Jennings et al. | .............. | 718/103 |
| 7,877,686 | B2 | * | 1/2011 | Abbott et al. | ................. | 715/712 |

* cited by examiner

*Primary Examiner* — Meng-Ai An
*Assistant Examiner* — Bing Zhao
(74) *Attorney, Agent, or Firm* — Stroock & Stroock & Lavan LLP

(57) ABSTRACT

The present invention pertains to the field of onboard flight management systems embedded in aircraft. The invention relates to a reconfiguration device (1) for reconfiguring a task processing context.

The reconfiguration device (1) according to the invention notably comprises:
  a module for managing the tasks to be carried out (2), performing a sorting of the tasks according to a priority criterion;
  a module for managing a current task (3), managing the state of progress of the current task;
  a module for managing a context (4), saving contexts relating to the current task, to a highest priority task and restoring one of the contexts saved on order of an operator.

The present invention notably finds its application in the management of tasks for piloting an aircraft, for example the management of tasks originating from a system for managing alerts and procedures.

10 Claims, 3 Drawing Sheets

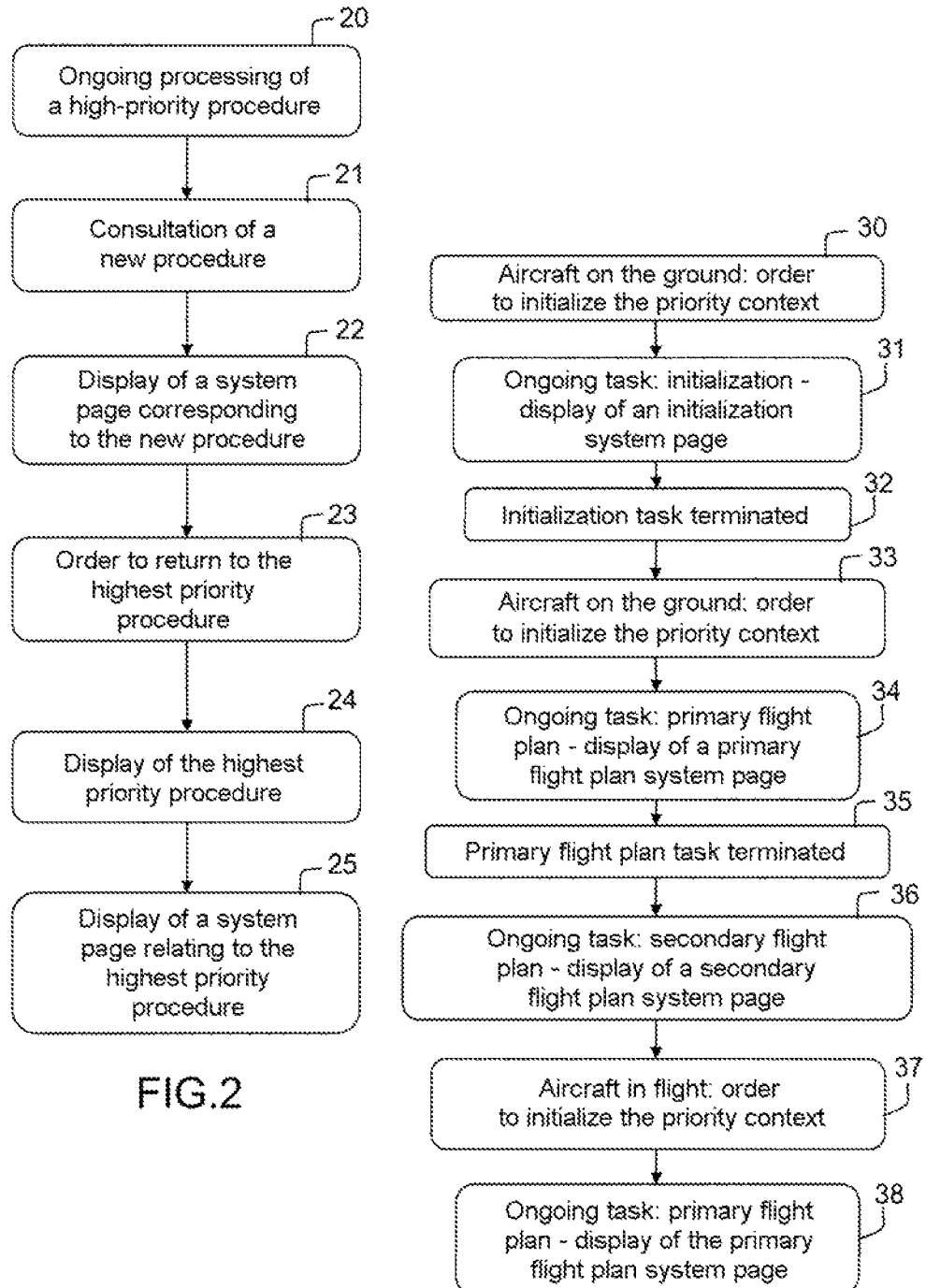

USER CONTROLLED RECONFIGURING AND SAVING OF A TASK CONTEXT COMPRISING A CONFIGURATION OF A SET OF TOOLS USED BY THE USER

CROSS REFERENCE TO RELATED APPLICATIONS

The present application claims priority to French Patent Application Serial No. 0807405, filed Dec. 23, 2008, which is hereby incorporated by reference in its entirety.

BACKGROUND OF THE INVENTION

The present invention pertains to the field of onboard flight management systems embedded in aircraft. The invention relates to a device for reconfiguring a task processing context. The present invention notably finds its application in the management of tasks for piloting an aircraft, for example, the management of tasks originating from a system for managing alerts and procedures.

BRIEF DESCRIPTION OF THE PRIOR ART

A crew of an aircraft works in an environment full of information. The crew is notably subjected to a lot of stimuli affecting the various senses: visual, auditory, tactile and even olfactory stimuli when smoke is released following the outbreak of a fire. All these stimuli must be taken into account by the crew. The crew must indeed have a reaction suited to each stimulus. This work environment generates permanent stress which becomes very significant should there be a problem.

In order to manage various systems of the aircraft, and to ensure basic piloting of the aircraft, the crew must perform various actions in a concurrent manner from among:
   actions on primary controls of the aircraft: stick, rudder bar, engine power control, propeller pitch control, compensator control;
   regular flight safety checks: checking of the primary flight parameters such as the engine operating parameters, the speed, the altitude; monitoring of the environs of the aircraft; tracking of alerts involving procedures to be implemented to deal with the alerts;
   navigation tasks: notably entry of accurate and complex information by the crew such as a flight plan;
   monitoring of the ATC, the acronym standing for the expression Air Traffic Control, signifying surveillance of the air traffic which requires notably: passive listening for orders from an air traffic controller, active dialogues with the air traffic controller;
   communications with an airline by way of ACARS messages, the acronym standing for the expression Aircraft Communications Addressing and Reporting System;
   an item of information regarding the passengers and CFPs, the acronym standing for Commercial Flight Personnel.

The concomitance of the various stimuli with the actions to be carried out by the crew gives rise to frequent interruptions to the piloting tasks executed by the crew.

To accomplish the various tasks related to the piloting of the aircraft and to the management of alerts, the crew are provided with tools allowing them to plan tasks. The crew can carry out tasks in the order that they wish. The order in which the tasks are carried out may be different from the order advocated by procedures defined by an airline or by a constructor of the aircraft for example. Thus the crew may, accidentally or intentionally, carry out a task which does not have the highest priority out of all the tasks that they have to accomplish. For example, in a situation of stress, the crew may make an error when assessing the degree of urgency in carrying out certain priority tasks. To return to processing the highest priority task, the crew must perform a certain number of actions: such as running through the whole set of tasks that they have to accomplish so as to retrieve the highest priority task, or manually reconfiguring an execution environment for the highest priority task so as to perform the processing thereof. An execution environment of a task comprises tools necessary for accomplishing this task. The tools necessary for accomplishing a task can be interfaces:
   making it possible to access for example a page for entering or for modifying a flight plan;
   for managing various systems of the aircraft;
   for presenting system pages comprising notably information regarding the state of a system of the aircraft, data entry forms;
   for presenting procedures to be complied with while accomplishing a task, the said procedures possibly being displayed on a screen in the form of a series of ordered actions to be carried out.
Manual reconfiguration of a task execution environment comprises complex operations which are difficult to carry out in a stressful situation, or following an interruption in the processing of a procedure. The crew may thus lose valuable time in reconfiguring the environment for carrying out a high priority task. For example: the crew is currently modifying a primary flight plan. An alert crops up signifying a risk of collision with another aircraft. The alert requires an emergency turn. The crew must cease modifying the flight plan so as to commence an avoidance procedure and carry out the emergency turn. Thereafter, the crew must verify that the emergency measure performed has properly solved the problem at hand and that the alert has disappeared. Once the danger has passed, the crew must manually reconfigure all the means for modifying the primary flight plan in order to resume the modification just where they had left it. This therefore causes a loss of time and a risk of the modification of the primary flight plan being incomplete, if the crew, due to stress, have forgotten the last modification action that they had undertaken before the interruption.

A task execution context groups together the set of configurations of the tools necessary for carrying out a task. A configuration can correspond to a state of the tool at a given instant. For example, a configuration can correspond to a set of information displayed on a screen, to a set of windows for entering data presented on a man machine interface.

The various existing context management systems currently allow only a return to one of the last configuration states of a task processing system. Other systems make it possible to return to a given configuration, but always the same one. The given configuration can either be parametrized in the system or be an initial configuration of the system, the given configuration always being the same during the use of the system. These systems therefore do not allow a return to a configuration other than a specific configuration or one of the last configurations.

SUMMARY OF THE INVENTION

An aim of the invention is notably to alleviate the aforesaid drawbacks. For this purpose, the subject of the invention is a device for reconfiguring a processing context for tasks to be carried out by an operator.
The device according to the invention notably comprises:
   a first module for managing tasks to be carried out;

a second module for managing a current task;
a third module for managing contexts.

The module for managing tasks can notably:
perform a sort according to an order of priority of the tasks to be carried out;
transmit notably to the third module for managing contexts the highest priority task to be processed;
transmit notably to the second module for managing a current task, a task selected by the operator by means of a first interface, from among the tasks to be carried out.

The module for managing a current task can notably:
update a state of progress of processing of the current task for example as a function of progress information entered by the operator by means of a second interface;
transmit the updated state of progress notably to the third context management module.

The module for managing contexts can notably:
store in a first database notably the current task, the state of progress of the current task, a processing context for the current task;
store in the first database the highest priority task, a state of progress of the highest priority task, a processing context for the highest priority task;
restore notably the highest priority task, the state of progress of the highest priority task, the processing context for the highest priority task to the module for managing the current task.

The module for managing current tasks can notably transmit the current task to the third context management module.

The context management module can notably:
save notably an current task to be restored, the state of progress of the current task to be restored, the context of the current task to be restored, for example on an order from the operator transmitted by means of a third interface to the module for managing a context;
restore, for example on order of the operator transmitted to the context management module by means of a fourth interface, the saved task, the state of progress of the saved task, the context of execution of the saved task.

A processing context comprises for example a configuration of a set of tools for carrying out a task, the said tools possibly being interfaces of systems external to the device according to the invention.

The interfaces of the external systems can transmit their configuration to the module for managing contexts. The module for managing contexts can store the configurations received in context data for example associated with the current task.

The tasks managed by the module for managing tasks can originate from systems external to the device according to the invention.

The device according to the invention can comprise a first means for displaying the sorted tasks, for example transmitted to the first display means by the module for managing the tasks.

The device according to the invention can comprise a second display means presenting to the operator notably the task currently being carried out and its state of progress, the current task and its state of progress being for example transmitted to the second display means by the module for managing the current task.

The module for managing tasks can sort the tasks by using a sorting criterion for example modifiable by a user.

The context manager can restore a context by configuring the external systems.

The module for managing the current task can store the state of progress of the current task in a second database.

The invention has notably the main advantage of allowing the crew to pass from a first current context for carrying out a first task to a second context for carrying out a second task, for example taking priority, without having to manually reconfigure the task execution environment thereof.

BRIEF DESCRIPTION OF THE DRAWINGS

Other characteristics and advantages of the invention will become apparent with the aid of the description which follows, given by way of nonlimiting illustration, and with regard to the appended drawings which represent:

FIG. 2: a first case of use of the device according to the invention;

FIG. 3: a second case of use of the device according to the invention;

DETAILED DESCRIPTION

Figure 1:
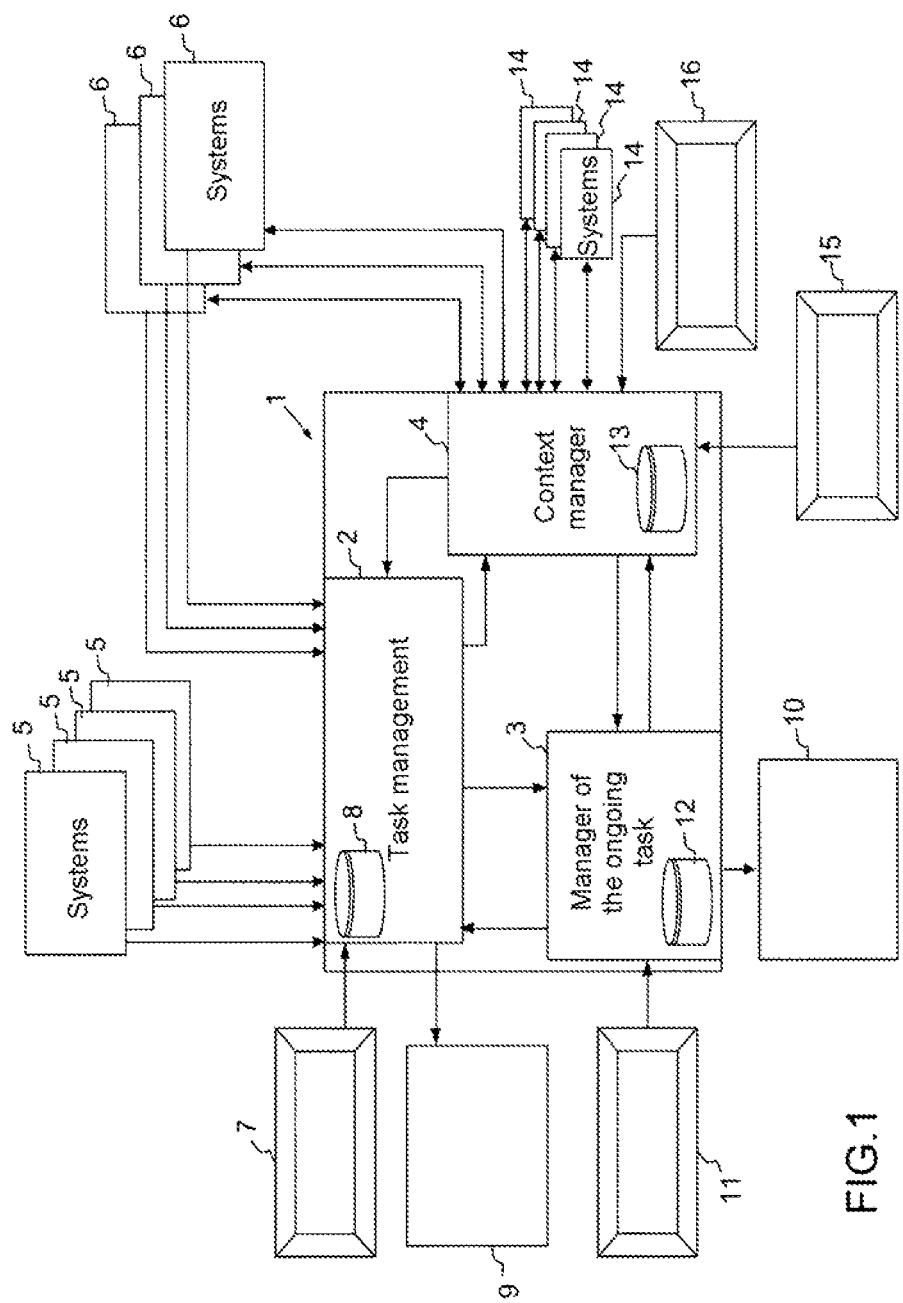
FIG. 1: a device according to the invention for reconfiguring a processing context for a task.

FIG. 1 represents in a schematic manner a reconfiguration device 1 for reconfiguring a task processing context according to the invention. The configuration device comprises notably three modules:
a first module for managing tasks 2;
a second module for managing a current task 3;
a third module for managing processing context for tasks 4.

The first module for managing tasks 2 makes it possible to manage a set of tasks to be carried out by an operator. The operator can be a member of a crew of an aircraft for example. The first module for managing tasks 2 makes it possible to add a task to the task set. A task can be added on receipt of a task originating from a system 5, 6, external to the device 1 according to the invention. A task can also be added on receipt of an add task event originating for example from the second module for managing a current task 3.

The first module for managing tasks 2 allows a task to be deleted from the set of tasks that it manages. A task deletion can be performed by the first module for managing tasks 2 on receipt of a task deletion order originating from an external system 5, 6. A task deletion can also originate from an internal event. For example an execution of a task can entail the need to accomplish several other tasks related to the executed task. A terminated task can also be deleted by the module for managing tasks 2. A task can also be deleted on a deletion order originating from the operator. Such a deletion order can be issued by the operator by means of a first interface 7. The first interface 7 can be a man machine interface allowing the operator various orders to the first module for managing tasks 2. A task deletion information item can also be transmitted to other modules of the context configuration device 1 according to the invention.

The first module for managing tasks 2 can perform a sort of the tasks. A sort of the tasks can be performed according to an order of priority in the processing of the various tasks. For example, a priority level can be associated with a task. The priority level associated with a task can be defined in a first database of tasks 8. In another embodiment of the invention, an order relation can be defined between the various tasks. This order relation can be defined by default by an aircraft constructor using the context reconfiguration device 1 according to the invention for example. An order relation can also be defined by a user of the aircraft such as an airline. For example an airline may favour procedures aimed at reducing fuel consumption from among various procedures that may possibly be performed on takeoff. A user can also define an order relation making it possible to sort the tasks. For this purpose, the user can choose a sorting criterion making it possible to obtain an order relation between the tasks. A criterion can for example be chosen from the following criteria: the oldest task, the task with the most significant priority level. A result of the sorting of the tasks can be a list of tasks sorted by order of priority, the first task having for example the highest priority. Once the tasks have been sorted by order of priority, the tasks can be displayed in the form of an ordered list by a first display means 9 such as a screen.

The first interface 7 makes it possible to navigate around the list of tasks displayed by the first display means 9. The operator can thus choose and select a task that he wishes to carry out from among the set of displayed tasks. The first interface 7 therefore allows the user to select a task. The selected task is thereafter transmitted by the first interface 7 to the first module for managing the tasks 2. On receipt of the selected task, the first module for managing tasks 2 transmits the selected task to the second module for managing the current task 3.

Once the tasks have been sorted by order of priority, the highest priority task or the task selected can be transmitted to other modules of the context configuration device 1 according to the invention as set forth further on.

The second module for managing a current task 3 takes into account the current task originating from the second module for managing the tasks 2. The current task is transmitted to a second display means 10. The second display means 10 displays the current task as well as various information pertaining thereto. For example, the second display means 10 can display a state of progress of the processing of the current task. The second display means 10 can display for example various actions necessary for accomplishing the current task.

The second module for managing a current task 3 manages the state of progress of the current task. A second interface 11 allows for example the operator to advance the state of progress of a current task. A progress order is then transmitted to the second module for managing a current task 3. The operator can for example acknowledge one of the actions making up the task so as to signify that the action is completely performed. The user can, by way of the second interface 11, acknowledge the current task when it has terminated.

When the current task has terminated, the second module for managing a current task 3 transmits an order to delete the current task to the first module for managing the tasks 2. On receipt of the order to delete the current task, the first module for managing the tasks 2 deletes the current task.

The processing of a current task may require the processing of other tasks for example when the accomplishing of the current task depends on the accomplishing of other tasks. The second module for processing the current tasks 3 comprises a second database 12. The second database 12 comprises the set of tasks that may possibly be carried out as well as dependency ties that may exist between the various tasks. When the second current task management module 3 receives a new selected task, it checks in the second database 12 to verify whether the task received depends on other tasks. If this is the case, the second current task management module 2 transmits the tasks upon which the current task depends to the first module for managing tasks 2. The first module for managing the tasks adds the tasks transmitted to the set of tasks that it manages.

The second module for managing a current task 3 transmits the current task as well as its updated progress to the third context management module 4.

The third context management module 4 makes it possible to manage a current context of execution of a task. A current context of execution of a task comprises notably the state of progress of the task, as well as configurations of external systems 6, 14 making it possible to execute the current task. For example if the current task is a flight plan modification, the user performs the modification by way of an FMS system. An FMS system, the acronym standing for the expression Flight Management System, offers flight plan display and modification interfaces.

The set of contexts associated with the various tasks can be stored in a third database 13. Thus on receipt of a current task, the third context management module 4 will search through the third database of contexts 13 for the context corresponding to the task to be processed. According to the context of the task, the context manager transmits context commands to the various external systems 6, 14 used in carrying out the current task. The external systems 6, 14 are notably reconfigurable systems. A context command makes it possible notably to configure an external system in such a way that it provides a user with tools necessary for processing the current task. For example, in the case of a flight plan modification, a context command makes it possible to configure the FMS so that it provides tools for modifying a flight plan. Generally, a context command makes it possible to activate a context for carrying out a given task.

The context manager 4 receives the current task and its current processing progress from the current task manager 3. On receipt of the current task and its progress, the context manager 4 stores in the third database of contexts 13 the information received: the current task, its current progress. The context manager also records in the context database 13 the context associated with the current task and with its state of progress.

Moreover, the external systems 6, 14 transmit their current configuration to the context management module 4 which stores these configuration data corresponding to the current task such as the current context of execution of the current task.

The context manager 4 can also receive from the tasks manager 2 the highest priority task to be processed. If the processing of the highest priority task has already begun, the current task manager 3 has already transmitted a state of progress of the processing of this priority task. The state of progress of the priority task is therefore already stored in the third context database 13. The context manager 4 therefore keeps two contexts up to date: a current context, relating to the task currently being carried out, and a priority context, relating to the highest priority task.

A third interface 15 allows a user to choose a current context to be saved by the context manager 4. The third interface 15 then dispatches an order to save the current state of the current context to the context manager 4. The context manager 4 then saves the current task, its state of progress and its context. The current task, its context and its progress then become a task to be restored and a context to be restored. The third context management module 4 therefore also manages a context to be restored which can be initialized by an order from the user. The context to be restored can also be deleted, when the task concerned has been accomplished or when it has been deleted. Thus, the tasks manager 2 transmits the deletions of tasks to the context manager 4.

A fourth interface 16 allows a user to restore a context associated:

with a task to be restored for which it has previously ordered the saving by means of the third interface;

with a highest priority task if no task to be restored is recorded;

The associated context can be restored following a transmission of a context restore order to the context management module 4 on an action of the user by means of the fourth interface 16.

On receipt of a context restore order originating from the fourth interface 16, the context management module 4 transfers:

to the tasks manager 2: the task to be restored if a task to be restored is saved, otherwise the highest priority task.

to the current-task manager 3 the task to be restored and its state of progress if a task to be restored is saved, otherwise the highest priority task and its state of progress;

to the external systems 6, 14 used for carrying out the task: the saved context, associated with the task to be restored if such a task has been saved; otherwise the context corresponding to the state of progress of the processing of the highest priority task.

On receipt of a new current task and its progress, the module for managing the current task 3 transmits the new current task for display, to the second display means 10.

On receipt of a context restore order, the context is transmitted to the external systems 6, 14 in the form of a context command which makes it possible to reconfigure the external systems 6, 14 so as to reproduce the context.

Among the set of external systems connected with the context configuration device 1 according to the invention:

first systems 5 can transmit tasks to the context configuration device 1, but are not reconfigurable;

second systems 6 can transmit tasks to the context configuration device 1 and receive context commands originating from the context configuration device 1;

third systems 14 do not transmit any tasks, but can take into account context commands originating from the context configuration device 1, they are therefore reconfigurable.

The first systems 5 can be for example electrical systems such as buses or flight control systems.

The second systems 6 can be for example an FMS system, an FWS system, the acronym standing for the expression Flight Warning System, the FWS being an alert management system.

The third systems 14 can be information viewing systems.

The user can therefore on a simple action, by way of the fourth interfaces 16, return to a configuration of a task processing context allowing him to carry out the hierarchically most important task from among the tasks that he has to accomplish. The configuration of the context according to the invention is a dynamic configuration: it depends on the set of tasks, including the current task and on events such as: a new task with a high priority level is added to the set of tasks managed by the first module for managing the tasks 2, the highest priority task is completed. The two aforementioned events lead to a new sorting of the set of tasks so as to determine the new highest priority task. For the first event, the new highest priority task is the added task, for the second event the new highest priority task is the second highest priority task.

The user also has the possibility, on a simple action carried out on the third interface 15, of defining the most important task for him. For example when the user is interrupted in the course of processing a task, he can choose to save the processing context of his current task so as to return to it once the interruption has terminated.

FIG. 2 represents a first case of use of the device for configuring a task processing context according to the invention. The first case of use is described by means of an example applied to an avionics system: an FWS system.

Three tasks are for example displayed by orders of priority level on the first display system 7. The three tasks may for example be the following tasks, cited by priority level, the first having the highest priority:

normal approach procedure;

abnormal procedure following an alert originating from the FWS corresponding to a loss of a hydraulic circuit;

abnormal procedure related to an alert originating from the FWS following a loss of an electrical circuit.

The procedure undergoing processing 20 is the procedure comprising the most important priority. A pilot manually consults 21 the abnormal procedure to be implemented following a loss of hydraulic circuit. A first system page is displayed 22 on a remote screen so as to present a state of the hydraulic systems of the aircraft to the pilot. The pilot uses the fourth interface 16 to issue an order to return to the highest priority procedure 23. The procedure relating to the highest priority procedure is displayed on a second system page 25. The second system page is therefore displayed automatically so that the pilot can terminate the normal approach procedure. An action to be accomplished by the pilot in the course of the normal approach procedure is for example a check of the cabin pressure. Thus the pilot can carry out the procedure relating to an important alert and simply return to the procedure that he was in the process of accomplishing.

FIG. 3 represents a second case of use of the device for reconfiguring a context 1 according to the invention. The second case of use applies to an avionics system: an FMS.

An FMS system allows notably flight plan definition. When the aircraft is on the ground, tasks relating to the use of an FMS may be in order of priority:

initialization of the FMS;

definition of a primary flight plan;

definition of a secondary flight plan;

when the aircraft is in flight, tasks relating to the use of an FMS may be in order of priority:

presentation of the primary flight plan;

presentation of the secondary flight plan;

checking of flight performance.

The FMS system is initialized when starting up the aircraft on the ground. A pilot of the aircraft can then issue an order to initialize the context corresponding to the highest priority task 30 by way of the fourth interface 16. The FMS initialization page is then displayed. Once the initialization task has terminated 32, the initialization task is no longer the highest priority task.

The pilot can then change task by using the fourth interface 16 to pass to the second highest priority task. The order for initializing the context, corresponding to the highest priority task 33, makes it possible to display a third system page corresponding to the primary flight plan. The pilot can thus enter the primary flight plan. Once the flight plan has been entered, the task corresponding to the modification of the primary flight plan is no longer the highest priority task. The highest priority task becomes the task of modifying or entering the secondary flight plan. When the pilot gives the order for configuring the context corresponding to the highest priority task, a fourth system page corresponding to a secondary flight plan entry page is displayed 36. If the aircraft takes off, the highest priority task is no longer the task of entering the secondary flight plan. When the pilot uses the fourth interface 16 to reinstate a context corresponding to the highest priority task 37, the device 1 according to the invention configures a context relating to the presentation of the primary flight plan 38. Indeed, when the aircraft is in flight, the highest priority task for the FMS is the presentation of the primary flight plan 38.

Advantageously, the device 1 according to the invention allows the pilot to have fast access to the context of execution of the highest priority task that he has to execute as a function of a context of deployment of the aircraft.

Figure 4:
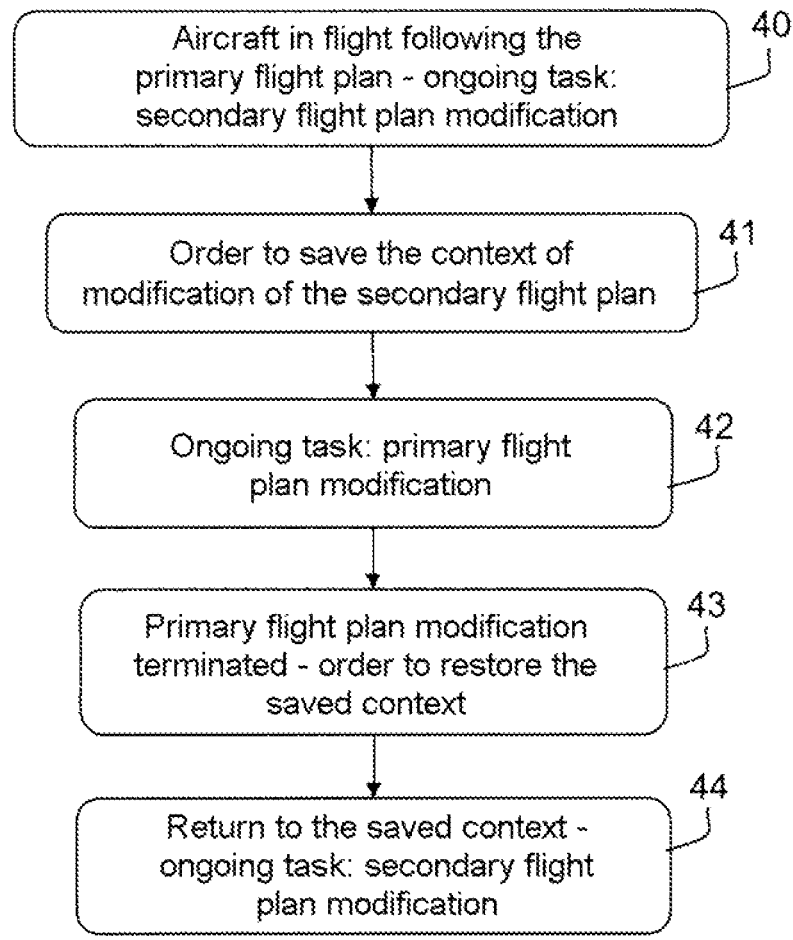
FIG. 4: a third case of use of the device according to the invention.

FIG. 4 represents a third case of use of the device for configuring a context 1 according to the invention. The third case of use applies to the FMS system. In the third case of use, the aircraft is in flight, following a primary flight plan. A secondary flight plan is undergoing modification 40 by a pilot of the aircraft. A message originating from the ATC requires an interruption of the task of modifying the secondary flight plan. For example, an air traffic controller may request a modification of the primary flight plan: go directly to a waypoint given by the controller without passing through one of the waypoints of the initial primary flight plan. The pilot can then save the modification context for the secondary flight plan 41 by issuing an order to save the current context by way of the third interface 15. The pilot can then access a fifth system page for modifying the primary flight plan to perform the action requested by the controller 42. Once the modification of the primary flight plan has been performed, the pilot can retrieve the context of execution of the task of modifying the secondary flight plan that he was in the process of performing. The pilot then issues an order to restore the saved context 43 through an action on the fourth interface 16. A sixth system page corresponding to the current modification of the secondary flight plan is then redisplayed 44. A cursor can be situated on the sixth system page at the state of progress of the saved modification. Displays on peripheral screens, such as on a navigation screen, can be restored to the same scale as that displayed before the interruption.

The device according to the invention therefore allows the pilot to return to the task that he was in the process of accomplishing even in the case of interruption compelling him to modify his task execution context. The context of execution of the interrupted task can be restored as a whole by the device 1 according to the invention.

The third and fourth interfaces 15 and 16 can be embodied in the form of two buttons that an operator can simply actuate when he wishes respectively, to save a task execution context. The buttons can be mechanical buttons such as push-buttons. The buttons can also be embodied on a man machine interface and actuated with the aid of a cursor positioned on a screen of the man machine interface.

The device for configuring a task execution context can be effected by a computer program implementing the functions of the various modules 2, 3, 4 of the device 1 according to the invention. Such a device according to the invention can be integrated into an FWS system for example or into another flight management system of an aircraft.

The device for configuring a task processing context makes it possible advantageously to assist a crew in the execution of the piloting tasks that they have to accomplish notably in the course of a flight.

In a work environment overloaded with tasks to be accomplished or in an environment with significant stress, an operator can, by virtue of the device according to the invention, return through a simple action to a configuration of his environment for executing a task, thus allowing him to carry out the highest priority task.

Advantageously, when the operator is interrupted in the processing of a task by exterior elements, he can easily return to the configuration allowing him to continue the task that he was processing before the interruption.

Moreover, when carrying out a complex task requiring for example a modification of the configuration of the context so as to search for information or to accomplish actions necessary for the execution of the task, the operator can return to his processing simply. The execution of a complex task is facilitated by the device according to the invention: indeed, the operator does not spend any superfluous time in manually reconfiguring the task's execution environment. Moreover the invention allows the operator to easily reload a context corresponding to the processing of a particular task, it being possible for contexts associated with particular tasks to be stored in the third database of contexts 13.

Advantageously the device for reconfiguring a task processing context according to the invention can be used in various cases where an operator has to accomplish a set of tasks. The invention is particularly advantageous when tasks may be performed in a concurrent manner or the processing of a task may suffer an interruption. Thus the device according to the invention may be applicable to the piloting of an aircraft, to the piloting of a boat, to the operating of a complex set of systems such as the operating of a factory, an assembly line, a chemical reactor or a nuclear power facility, as well as to the use of a computerized system comprising several concurrent applications

The invention claimed is:

1. A device with a processor for reconfiguring a processing context for tasks to be carried out by a user, comprising:
   a module for managing processing tasks to be carried out respectively associated with the tasks to be carried out by the user;
   a module for managing a current processing task;
   a module for managing processing contexts associated with the processing tasks, each processing context comprising a configuration of a set of tools used by the user to carry out a task;
   a first user interface for enabling a user to select a processing task corresponding to a task to be carried out by the user; and
   a second user interface for enabling the user to enter progress information relating to a processing task corresponding to a task to be carried out by the user;
   the said module for managing processing tasks configured to perform steps including the following steps:
   performing a sorting according to an order of priority of the processing tasks to be carried out;
   transmitting to the module for managing processing contexts associated with the processing tasks, a highest priority processing task to be processed in accordance with the order of priority of the processing tasks; and
   transmitting to the module for managing a current processing task, a processing task selected by the user by means of the first user interface, from among the processing tasks to be carried out;
   the said module for managing a current processing task configured to perform steps including the following steps:
   updating a state of progress of processing of the current processing task as a function of progress information entered by the user by means of the second user interface; and
   transmitting the updated state of progress to the module for managing contexts associated with the processing tasks; and
   the said module for managing processing contexts associated with the processing tasks configured to perform steps including the following steps:

storing in a first database the current processing task, the state of progress of the current processing task, and a processing context for the current processing task;

storing in the first database the highest priority processing task, a state of progress of the highest priority processing task, and a processing context for the highest priority processing task; and restoring the highest priority processing task, the state of progress of the highest priority processing task, and the processing context for the highest priority processing task to the module for managing the current processing task.

2. The device according to claim 1, wherein:

the module for managing a current processing task transmits the current processing task to the module for managing processing contexts associated with the processing tasks; and the module for managing processing contexts associated with the processing tasks:

saves the current processing task, the state of progress of the current processing task, and the processing context of the current processing task, in response to an order from the user transmitted by means of a third user interface to the module for managing processing contexts associated with the processing tasks; and restores, in response to an order of the user transmitted to the module for managing processing contexts associated with the processing tasks by means of a fourth user interface, a saved processing task, a state of progress of the saved processing task, and a processing context of the saved processing task.

3. The device according to claim 1, wherein the tools include device interfaces of systems external to the device according to the invention.

4. The device according to claim 3, wherein the device interfaces of the external systems transmit their configuration information to the module for managing processing contexts associated with the processing tasks, the said module for managing processing contexts associated with the processing tasks storing the configuration information received in context data associated with the current task.

5. The device according to claim 1, wherein the processing tasks managed by the module for managing processing tasks originate from systems external to the device according to the invention.

6. The device according to claim 1, further comprising a first display means, the first display means configured to display the sorted processing tasks, which are transmitted to the first display means by the module for managing processing tasks.

7. The device according to claim 1, comprising a second display means, the second display means configured to present to the user the processing task currently being carried out and its state of progress, the current processing task and its state of progress being transmitted to the second display means by the module for managing the current processing task.

8. The device according to claim 1, wherein the module for managing processing tasks sorts the processing tasks by using a sorting criterion modifiable by the user.

9. The device according to claim 4, wherein the module for managing processing contexts restores a context by configuring the external systems utilizing the corresponding stored configuration information.

10. The device according to claim 1, wherein the module for managing the current processing task stores the state of progress of the current processing task in a second database.

* * * * *